Patented Dec. 1, 1931

1,834,210

UNITED STATES PATENT OFFICE

PAUL RALPH HERSHMAN, OF CHICAGO, ILLINOIS, ASSIGNOR OF ONE-FOURTH TO C. O. SETHNESS, ONE-FOURTH TO C. H. SETHNESS, AND ONE-FOURTH TO PAUL RUDNICK, ALL OF CHICAGO, ILLINOIS

PRODUCTION OF ALKALI METAL HYPOCHLORITES OF THE FORM NaOCl

No Drawing.  Application filed April 25, 1927. Serial No. 186,580.

As I have explained in my prior application Serial No. 179,189, filed March 28, 1927, water soluble hypochlorites are known to have useful disinfecting and bleaching properties; and I have there disclosed several methods of producing them in a stable form, permanently retaining the available chlorine therein. In accordance with one of such methods alkali metal hypochlorites of the form of

are evaporated to dry form by using sodium silicate as a stabilizer.

I have now discovered that if the solutions that are employed are sufficiently concentrated, the sodium chloride contained in the hypochlorite molecule is precipitated, while the hypochlorite stays in solution. For instance, a solution of fifteen per cent sodium hypochlorites mixed with a solution of fifteen per cent sodium silicate deposits principally sodium chloride which can easily be removed and the liquor concentrated. The same result may be obtained by introducing chlorine into a solution of caustic soda and silicate of soda and filtering off the precipitate.

If the solutions are more dilute than those referred to above sodium chloride is thrown out during the first stages of concentration. Other alkali metal hypochlorites act in the same way as sodium hypochlorite under the corresponding treatment, that is when mixed with a stabilizer in which the chloride is insoluble.

I claim:

1. The process of producing alkali metal hypochlorites of the form Alk.Met.OCl, which consists in mixing an alkali metal hypochlorite containing a chloride molecule with sodium silicate, concentrating the mixture, and removing the precipitate.

2. The process of producing alkali metal hypochlorites of the form Alk.Met.OCl, which consists in forming a concentrated solution of an alkali metal hypochlorite containing a chloride molecule and sodium silicate, and then further concentrating the solution to effect precipitation.

3. The process of producing alkali metal hypochlorites of the form NaOCl, which consists in mixing sodium hypochlorite with a solution of sodium silicate, evaporating the solution, and removing the resulting precipitate.

In testimony whereof, I sign this specification.

PAUL RALPH HERSHMAN.